United States Patent [19]

Hansen et al.

[11] Patent Number: 4,859,995
[45] Date of Patent: Aug. 22, 1989

[54] MOUSE POINTER WITH SWITCHABLE EMULATION MODE

[75] Inventors: Ronald D. Hansen, Fremont; Clayton W. Mock, Mountain View; Abdo G. Kadifa, Palo Alto, all of Calif.

[73] Assignee: Xerox Corporation, Stamford, Conn.

[21] Appl. No.: 68,604

[22] Filed: Jun. 30, 1987

[51] Int. Cl.⁴ ............................................. G09G 3/02
[52] U.S. Cl. ..................................... 340/710; 340/721; 340/723
[58] Field of Search ............. 340/710, 709, 706, 712, 340/721, 723; 364/200, 300, 900

[56] References Cited

U.S. PATENT DOCUMENTS

| | | | |
|---|---|---|---|
| 4,101,879 | 7/1978 | Kawaji et al. | 340/709 |
| 4,204,206 | 5/1980 | Bakula et al. | 340/721 |
| 4,365,294 | 12/1982 | Stokken | 364/200 |
| 4,377,852 | 3/1983 | Thompson | 364/900 |
| 4,586,035 | 4/1986 | Baker et al. | 340/706 |
| 4,625,202 | 11/1986 | Richmond et al. | 340/709 |
| 4,709,328 | 11/1987 | Anthony, Jr. et al. | 364/200 |
| 4,710,762 | 12/1987 | Yamada | 340/721 |
| 4,722,048 | 1/1988 | Hirsch et al. | 364/200 |
| 4,727,480 | 2/1988 | Albright et al. | 364/200 |
| 4,757,441 | 7/1988 | Buckland et al. | 364/200 |
| 4,760,386 | 7/1988 | Heath et al. | 340/709 |

FOREIGN PATENT DOCUMENTS 0237671 9/1987 European Pat. Off. .
0247827 12/1987 European Pat. Off. .
0281054 9/1988 European Pat. Off. .

OTHER PUBLICATIONS

Krishnamurty, R. and Mothersole, T., "Coprocessor Software Support", IBM RT Personal Computer Technology, IBM Corporation Form No., SA 12-057, 1986, pp. 142-146.

Myers, B. A. and Buxton, W., "Creating Highly-Interactive and Graphical User Interfaces by Demonstration", Computer Graphics: SIGGRAPH '86 Conference Proceedings, Dallas, Tex., Aug. 18-22, 1986, pp. 249-257.

Primary Examiner—Gerald L. Brigance
Assistant Examiner—Richard Hjerpe
Attorney, Agent, or Firm—James T. Beran

[57] ABSTRACT

Mouse emulation includes two modes, a host mode in which the pointer behaves as the pointer of the host system and an emulating mode in which the pointer behaves as the pointer of the target system being emulated. The display of the target system appears in an emulation window within the host system display. The user can switch from host mode to emulating mode by clicking a mouse key when the pointer is located in the emulation window which also serves to make the emulation window the input focus for receiving user input signals from the keyboard. The user can switch from emulating mode to host mode by depressing a STOP key, a keystroke which need not be provided to the emulator because it would not be provided to the target system's CPU. Mouse related data is transferred to the emulator through a data structure in a reserved memory space which a mouse application does not access, such as the BIOS area if an IBM PC is being emulated. A mouse driver which provides standard responses to service requests from the application retrieves this data from the data structure, making hardware ports or software emulating or bypassing such ports unnecessary.

22 Claims, 6 Drawing Sheets

MOUSE POINTER WITH SWITCHABLE EMULATION MODE

BACKGROUND OF THE INVENTION

The present invention relates to a pointer controlled by a pointer control input device such as a mouse. More specifically, the invention relates to techniques for controlling the pointer to emulate a pointer in a system being emulated.

The Xerox 6085 workstation provides emulation of an IBM PC in a window, as described in copending, coassigned U.S. Pat. applications Ser. Nos. 856,525 and 856,526 ("the workstation applications"), both incorporated herein by reference. In other words, the user can obtain a display that includes a PC emulation window showing the image that would appear on the screen of a PC. This image is based on operations of an emulating coprocessor which provides its outputs to and receives its inputs from the host system. The user may interact with the workstation as if it were a PC, and the display in the emulation window will be updated appropriately by the emulator. Data from the user and from other sources is provided to the emulator through a data structure in memory space accessible to the emulator and allocated to the basic input/output system (BIOS) of the IBM PC. The workstation described in the workstation applications includes a mouse for controlling a pointer or cursor on the display, and, as noted, that mouse could be used to emulate a mouse used with an IBM PC.

Myers, B. A. and Buxton, W., "Creating Highly-Interactive and Graphical User Interfaces by Demonstration", *Computer Graphics: SIGGRAPH '86 Conference Proceedings*, Dallas, TX, August 18–22, 1986, pp. 249–257, describe a system for creating a user interface in which a simulated mouse, shown in FIGS. 3*f* and 5, is used to represent the pointer displayed by the interface being created. The designer of an interface being created also has a pointer which is under the control of the actual mouse in the system. The simulated mouse is like an icon, and can be moved by pointing at its nose with the actual mouse. The simulated mouse also has buttons which can be toggled by pointing at them and clicking a button on the actual mouse.

Krishnamurty, R. and Mothersole, T., "Coprocessor Software Support", in *IBM RT Personal Computer Technology*, IBM Corporation Form No. SA12057, 1986, pp. 142–146, describe a system in which a coprocessor is used to emulate an IBM PC AT personal computer. FIG. 3 shows that a system mouse may be included, but available only to the host processor, referred to as ROMP.

Baker et al., U.S. Pat. No. 4,586,035, describe an interactive display terminal with multiple overlapping windows. Some of the windows have associated virtual distributed menus not normally displayed. If the user moves a cursor controlled by a mouse across a selected region in a window periphery, a selected menu item associated with that region is displayed.

Kawaji et al., U.S. Pat. No. 4,101,879, describe a cursor movement control device for a screen segmented display apparatus. The cursor is moved line by line in each section by a device independent of the data display program on an external computer. The cursor movement control device includes registers for storing the addresses of the first and last positions of each cursor-displayed section of the segmented screen. The registers are controlled so that the data in the registers corresponding to the position of the cursor is compared with the addresses of the first and last positions to move the cursor, line by line, in the section.

Richmond et al., U.S. Pat. No. 4,625,202, describe a technique for generating multiple cursors in a multi-dimensional graphics display system. Each dimension has a range of addresses corresponding to locations in it. The cursor is presented by providing definition signals, each representing locations along one of the dimensions where the cursor occurs. In response to an address representing a location in the other dimension, a definition signal corresponding to that address is selected and a cursor signal is generated when an address in the first dimension corresponds to a location where a cursor occurs as represented by the definition signals.

It would be advantageous to have a more convenient technique for using the mouse of an emulating system to emulate a mouse in the system being emulated.

SUMMARY OF THE INVENTION

The present invention provides emulation of the features of the mouse in a target system being emulated, without sacrificing the features of the mouse in the host system performing the emulation. In particular, mouse emulation according to the invention is suitable where emulation is performed in a window or other part of the host system's display, referred to herein simply as "emulation in a window". The mouse can control a pointer within the emulation window as if it were a target system pointer and can also control the pointer throughout the display as if it were the host system pointer.

One aspect of the present invention is based on the recognition of a special problem which affects emulation in a window and other techniques in which a first means, such as an emulator, provides a first display and a second means, such as a host system, provides a second display which includes the first display. The problem is that signals from the mouse or other pointer control input device are ambiguous: They could be interpreted as the host system would interpret them if the emulator were not present, or they could be interpreted as the emulator would interpret them. Since the emulator may perform pointer control within the first display differently than the host system performs it within the second display, this ambiguity must be resolved in order to provide the second display.

This aspect of the invention is based on the further recognition that this ambiguity can be resolved by enabling the user to switch back and forth between two modes. In one mode, the host mode, the host system performs pointer control, so that the pointer may behave like a host system pointer. In the other mode, the emulating mode, the emulator performs pointer control, so that the pointer may behave like a target system pointer, remaining within the emulation window. The means performing pointer control receives pointer control signals and responds appropriately.

A closely related aspect of the invention is based on the recognition that the user must be able to invoke mode switching in both directions. Although this ability could be provided in many ways, this aspect of the invention is based on the recognition that the user can invoke a switch from host mode to emulating mode by making a mouse selection within the emulation window. This is an appropriate switching signal not only because it is consistent with the intuition of most users but also because a selection within the emulation window makes it the input focus, meaning that signals from the user affect the contents of the emulation window, as described in one of the workstation applications, U.S. Pat. application No. 856,525. Therefore, this signal can also be used to switch to the emulating mode, in which the mouse signals affect the contents of the emulation window. The switching signal for returning to the host mode can be any appropriate signal from the user, but cannot be one of the mouse signals which the target system uses for another purpose.

The first means may include an emulator for executing a sequence of instructions executable by the central processor of a target system such as an IBM PC. The emulator includes a processor which either executes those instructions directly or through other software which converts them into machine level instructions which it can directly execute. For example, this processor could be a coprocessor, as in the workstation applications. The processor could also be a high speed microprocessor such as an Intel 80386 or a Motorola 68020 or 68030, capable of performing emulator and host system operations at the same time through multitasking or similar timesharing techniques. Whatever the emulation technique, data must be transferred between host system operations and emulation operations.

Another aspect of the invention is based on the recognition of a problem in the transfer of mouse-related data to the emulation operations. Such a transfer is difficult to synchronize with the processor executing target system instructions if the data must be provided directly to that processor through input/output operations. One of the workstation applications, U.S. Pat. application No. 856,526, describes several techniques for transferring data to the emulator through input/output operations. Those techniques generally require synchronizing the data transfer with emulation operations by providing the data immediately when requested or by stopping and restarting the emulating processor in an appropriate manner. As a practical matter, this means that the emulator must include hardware I/O ports like those used by the target system processor or must execute special software to emulate or bypass such ports.

One exemplary technique described in that application is to transfer data through a data structure accessible within the memory space of the emulator. This data structure, MagicDataStructure, is located within the part of the emulator's memory space allocated to the basic input/output system (BIOS) of an IBM PC being emulated. Because this BIOS memory space is reserved, neither the DOS nor the higher level applications supported by DOS write to it. This is advantageous because a value such as an address for accessing a predetermined fixed location in BIOS memory space can be specified in host system and emulator software with certainty that no application will clobber the data at that location. When MagicDataStructure has been loaded with data, the emulator is restarted with a special routine, called the NMI correction routine, which retrieves the data and loads it into the appropriate register of the emulator as if it had been received as input from an I/O device. This special routine effectively bypasses the hardware ports, but produces the same result as if the ports themselves existed.

This aspect of the invention is based on the further recognition that the need for hardware ports or special software to emulate or bypass ports can be avoided if the target system is emulated by emulating the manner in which it responds to service requests from higher level applications. The software which handles those service requests may be implemented in any way which provides the appropriate response to each service request. Therefore, it is possible to use this software to transfer data to emulation operations directly, provided that the higher level applications are well-behaved, meaning that they provide the standard service requests and expect the standard responses.

Most higher level IBM PC applications which provide service requests for the mouse are well-behaved, so that this technique is especially suitable for mouse emulation. The popular Microsoft mouse driver accepts a set of standard commands from higher level software and responds in a standard way to those commands, so that most higher level applications using the mouse now provide that set of commands and expect those responses. Those commands and the responses are described in *Microsoft Mouse User's Guide*, Microsoft Corporation, Bellevue, Wash (1985), pp. 175-194, incorporated herein by reference. The Microsoft mouse driver handles service requests of the same general type as the BIOS of the IBM PC, although it is not part of the BIOS.

This aspect of the invention is thus based on the recognition that a data structure at a predetermined location in the BIOS memory space or the equivalent can be used to transfer mouse data to the emulator. The host system can load this data structure using its predetermined address at times when emulation operations are not being performed. In response to an interrupt from the host, a suitable mouse driver can then retrieve the data using the same address, and mouse operations can proceed based on the retrieved data without the need for special software to emulate or bypass the hardware ports of the system being emulated.

These and other objects, features and advantages of the invention will be more fully understood from the drawings together with the following description and claims.

DETAILED DESCRIPTION

A. General Description

Figure 1:
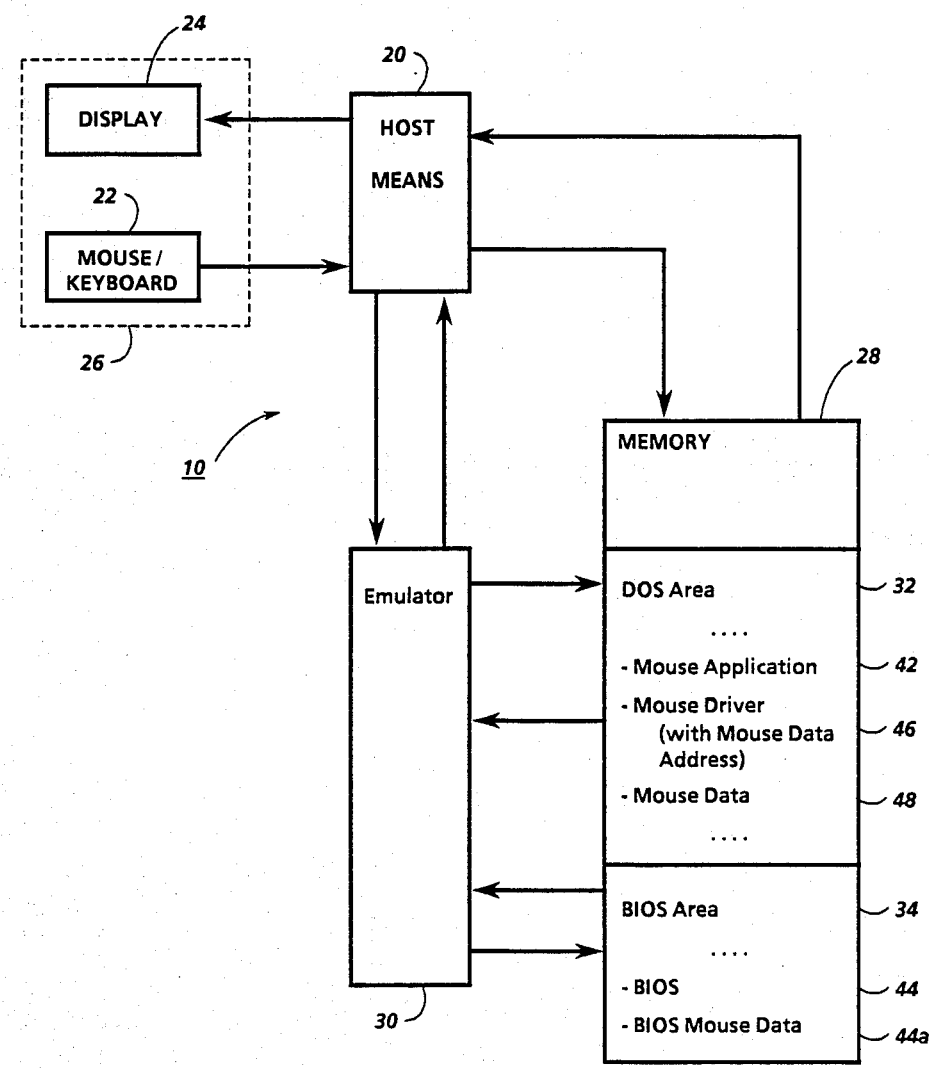
FIG. 1 is a functional block diagram of a system performing mouse emulation according to the invention.
Figure 2:
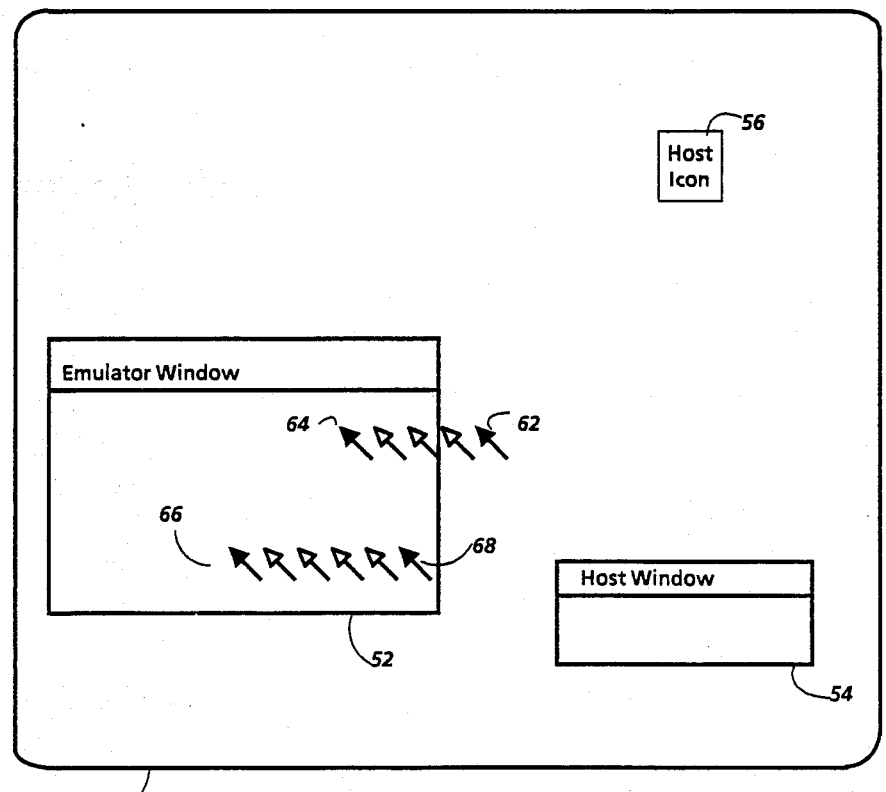
FIG. 2 is a schematic view of a display showing a sequence of pointers presented by the system of FIG. 1.
Figure 3:
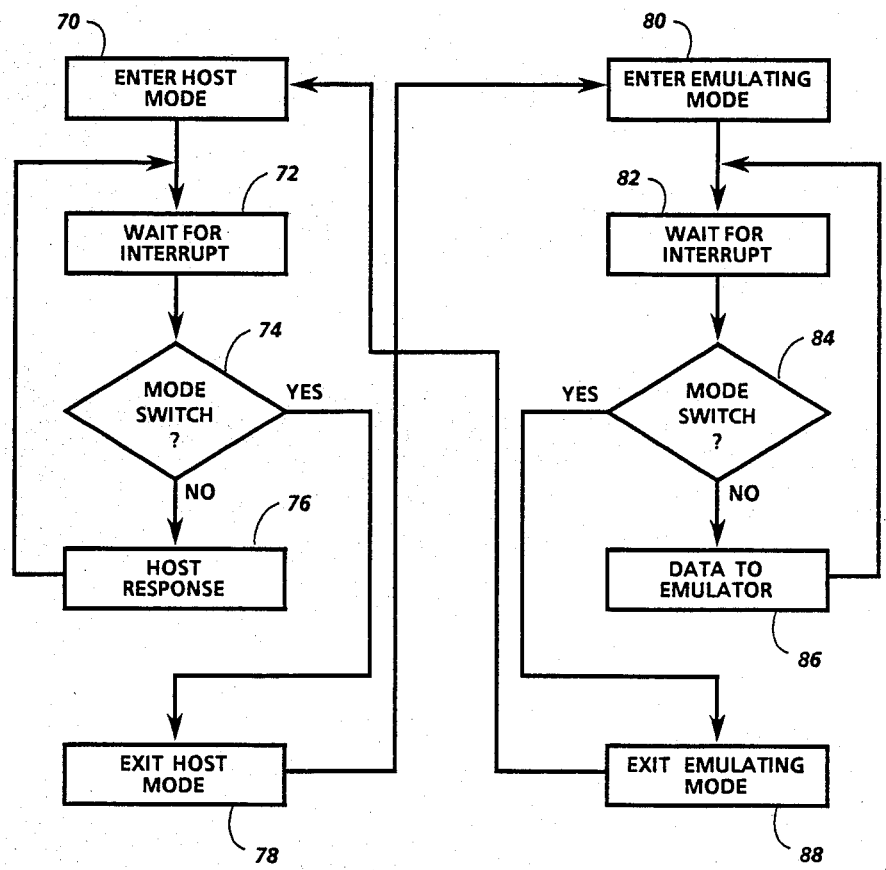
FIG. 3 is a flowchart showing the steps resulting in the sequence of FIG. 2.

The general features of the invention can be understood from FIGS. 1-3. FIG. 1 shows the functional components of a system performing mouse emulation according to the invention. FIG. 2 shows a sequence of pointers on a display which could result from operation of that system, while FIG. 3 shows the steps which result in that sequence.

System 10 in FIG. 1 includes host means 20 and emulator 30. Host means 20 receives user signals from mouse/keyboard 22 and provides signals to the user through display 24. Mouse/keyboard 22 and display 24 together form user interface 26. Host means 20 also has access to at least part of memory 28, part of which is also accessible to emulator 30. Emulator 30 is capable of executing a sequence of instructions of a target system such as the IBM PC. For that purpose, emulator 30 can access DOS area 32 in memory 28, the contents of which are managed by an operating system such as a disk operating system (DOS). The DOS manages DOS area 32 according to its own procedures, and may, for example, divide a file into parts stored at different locations in DOS area 32, so that the items shown in DOS area 32 may be stored in any appropriate manner. DOS area 32 can include a number of programs written for the IBM PC, including programs that use a mouse, one of which is shown as mouse application 42.

While executing a sequence of instructions in mouse application 42 or another program, emulator 30 may also access BIOS area 34, a memory space allocated to the IBM PC's basic input/output system (BIOS) and which is reserved from being written by the DOS or by any of the instructions stored in DOS area 32. In the IBM PC, the BIOS is stored in ROM, ensuring that it is read only and cannot be written. Other conventional hardware or software techniques may be used to protect all or part of BIOS area 34 from being written. In general, an application in DOS area 32 can provide any of a number of standard service requests that are handled by a BIOS 44 stored within BIOS area 34. Even though BIOS 44 is stored in BIOS area 34 as allocated in the IBM PC, BIOS 44 need not be identical to the standard IBM PC BIOS provided that it handles service requests from higher level applications with the same responses as the standard IBM PC BIOS.

Mouse application 42 is different from most DOS applications in that some of the service requests it provides cannot be handled by the standard IBM PC BIOS. The standard service requests which the IBM PC BIOS handles with standard responses do not include the mouse-related service requests because the standard IBM PC does not include a mouse. A number of recent products support mouse applications on the IBM PC or on equivalent machines by providing additional software to handle mouse-related service requests from those applications. For example, the Microsoft mouse driver has become sufficiently popular that most popular higher level mouse applications provide its standard service requests and expect its standard responses to those requests. The Microsoft mouse driver relies on hardware ports to receive mouse-related data, so that running it on emulator 30 would require the same hardware ports or special software emulating or bypassing those ports.

Instead of these approaches, the emulating means of system 10 includes BIOS mouse data 44a, a data structure within BIOS area 34 through which host means 20 transfers mouse-related data to emulator 30, as discussed in more detail below. BIOS mouse data 44a can be located at any suitable location not occupied by BIOS 44 or other software, such as in a space between BIOS routines. Rather than the Microsoft mouse driver, system 10 includes mouse driver 46, software in DOS area 32 that provides the standard responses to the standard requests and can access BIOS mouse data 44a using a predetermined mouse data address that is included or imbedded in it. Mouse driver 46 also accesses mouse data 48, a data structure in DOS area 32, to store various items of data temporarily during its operations.

Emulator 30, together with contents of DOS area 32 and BIOS area 34, serves as emulating means for executing IBM PC software, including DOS applications such as mouse application 42. During emulation, emulator 30 executes one of the DOS applications in DOS area 32 and also accesses BIOS area 34 to access instructions for handling service requests from that DOS application and for handling interrupts from other sources. In the process, emulator 30 also provides output signals and receives input signals, and host means 20 receives the output signals and provides the input signals, which may include interrupts, thereby providing an environment for emulator 30 so that emulation continues.

Host means 20 and emulator 30 could be implemented with any of a number of architectures. In general, these architectures fall into two categories, one in which emulator 30 includes a coprocessor dedicated to emulation and the other in which emulator 30 is one of a number of tasks or modes of a processor whose time is shared between emulation and host operations. The workstation applications provide an example of a coprocessor architecture, with the host means including a host processor and an input/output processor. With a more powerful microprocessor, however, it would be appropriate to perform the functions of all three of those processors on a single processor through some form of time sharing, such as multitasking or multiple modes. In either case, output signals from emulator 30 will be transferred to host means 20, which will provide an environment for emulator 30 so that emulation continues. These input and output signals may be exchanged through a data structure in memory 28 which emulates or bypasses a hardware port, such as through MagicDataStructure, discussed above.

The present invention provides a technique for data transfer during mouse emulation that makes use of BIOS mouse data 44a. This technique is appropriate for transferring pointer input control signals, such as signals based on manuipulation of a mouse by the user, from host means 20 to emulator 30, because the standard IBM PC, as noted above, does not include a mouse and therefore does not depend on a standard hardware port to transfer mouse-related data. Instead, the IBM PC supporting a Microsoft mouse driver receives mouse-related data through an additional mouse interface board providing additional hardware ports which are specified by the Microsoft mouse driver.

Since mouse driver 46 is not the same as the Microsoft mouse driver, it does not depend on these additional hardware ports, so that special software to emulate or bypass hardware ports is unnecessary. Instead, mouse driver 46 accesses mouse data structure 44a directly, using the mouse data address, a predetermined address in BIOS area 34. This address can be predetermined because BIOS 44 used in emulation is somewhat smaller than the IBM PC BIOS so that BIOS area 34 includes some unused addresses, which may, for example, be between routines. Although not necessarily read-only, the unused addresses are not written by DOS or by any well-behaved application in DOS area 32, as noted above. This predetermined address, one of those unused addresses in BIOS area 34, is also included in software for host means 20 so that it can load BIOS mouse data 44a, and may also be included in BIOS 44 if appropriate for other purposes. During times when emulator 30 is not executing, host means 20 can use this address to load BIOS mouse data 44a, and when emulator 30 resumes its operation, mouse driver 46 can access BIOS mouse data 44a without interrupting or interfering with emulation.

System 10 provides mouse emulation, as described above, but it is also necessary to use mouse/keyboard 22 to provide input to host means 20 in relation to the host display. FIGS. 2 and 3 show a technique according to the invention that allows for the use of mouse/keyboard 22 both in the host display and in the emulated display.

FIG. 2 shows screen image 50, all of which is a display provided by host means 20, but part of which, the contents of emulator window 52, is the display provided by emulator 30. Also within display screen 50 are host window 54, an example of a window whose contents are provided by host means 20, and host icon 56, an icon managed by host means 20.

Screen image 50 also includes illustrative pointers 62, 64, 66 and 68, not all of which would be displayed at once. Pointers 62 and 64 are instances of a host pointer that, in response to mouse movements by the user, moves from the position of pointer 62 outside emulator window 52 to the position of pointer 64 within emulator window 52. From that position it could be moved back to the position of pointer 62. In short, the user can move the host pointer to any position within screen image 50 because host means 20 provides all of the image.

Pointers 66 and 68 are instances of an emulated pointer, on the other hand, which is shown as having the same size as the host pointer, although the two need not be the same and could have any relative sizes and any arbitrary shapes. The emulated pointer, in response to mouse movements, moves from the position of pointer 66 to the position of pointer 68, both of which are within emulator window 52. But the emulated pointer cannot continue outside emulator window 52, because it is controlled by emulator 30 and therefore is confined to the part of screen image 50 provided by emulator 30, which is emulator window 52.

FIG. 3 shows how the invention permits the user to switch back and forth between the host pointer and the emulated pointer. Host means 20 has two pointer modes, a host mode shown at left in FIG. 3, and an emulating mode shown at right. FIG. 3 shows general functional steps taken in each mode by host means 20.

When host means 20 enters host mode, in box 70, it waits in box 72 for an interrupt. This interrupt could result from movement of the mouse or from a click of a button on the mouse or a key on the keyboard or it could come from other components of the system. As long as no interrupt occurs, host means 20 continues to wait, but may perform other operations such as refreshing the display and memory while waiting. Rather than waiting for an interrupt, of course, host means 20 could operate in a number of different ways, including polling all system components or any combination of polling some system components and waiting for interrupts from others. In general, however, because the user is slow compared to the system, host means 20 will wait for signals from the user.

When an interrupt occurs, host means 20 tests in box 74 whether the interrupt indicates a switch from host mode to emulating mode. For example, the user may signal such a switch by clicking one of the buttons on the mouse when the host pointer is at the position of pointer 64 or another position pointing to a location in emulator window 52. If the interrupt is not a switch signal, host means 20 performs its appropriate response to the interrupt, in box 76, before returning to wait for the next interrupt. Therefore, if the interrupt relates to mouse operations, host means 20 will control host mouse accordingly. But if the interrupt indicates a switch to emulating mode, host means 20 exits host mode in box 78 and enters emulating mode in box 80.

In emulating mode, host means similarly waits for an interrupt in box 82, performing display and memory refresh and other operations while waiting. When an interrupt occurs, the test in box 84 determines whether the interrupt indicates a switch from emulating mode to host mode. For example, a click of a "STOP" button on the keyboard could serve as this switch signal. If the interrupt is not a switch signal, host means 20 provides the appropriate data to emulator 30 based on the interrupt received, in box 86, and returns to wait for the next interrupt in box 82. Therefore, if the interrupt relates to mouse operations, emulator 30 will receive data enabling it to control the emulated mouse accordingly. But if the interrupt indicates a switch to host mode, host means 20 exits emulating mode in box 88 and enters host mode in box 70.

We turn now to consider in more detail how mode switching may be implemented. Then, we will consider the features of the BIOS and DOS applications which provide mouse emulation during the emulating mode.

B. Mode Switching

FIGS. 2 and 3 illustrate general features of switching between a mode in which the host controls the pointer and a mode in which the emulator controls the pointer. Each mode may be thought of as a state of system 10, with the transitions between the states resulting from switching signals from the user. Although mode switching depends on the implementation of emulation, the flow of data which permits mode switching will typically follow the same general pattern.

Figure 4:
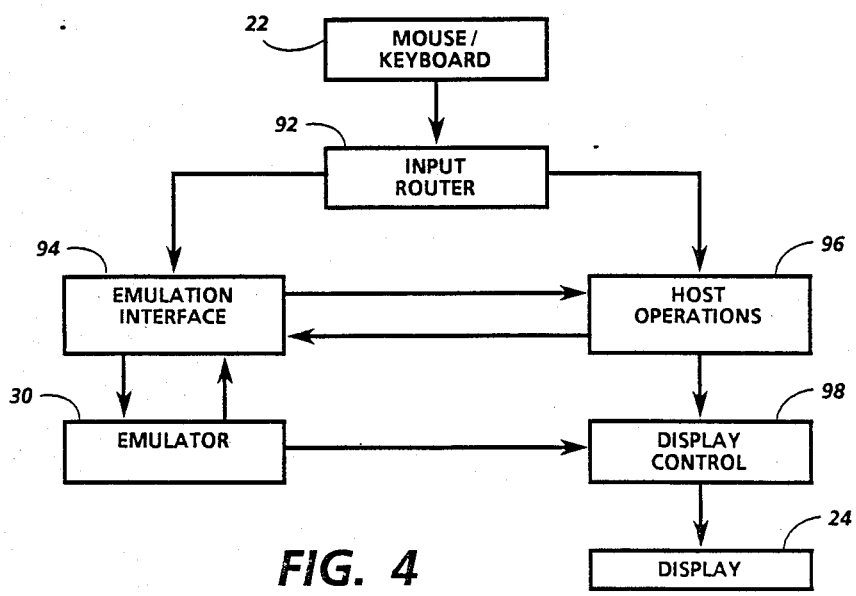
FIG. 4 is a functional block diagram showing the flow of user input data within the system of FIG. 1.

1. Data flow. FIG. 4 shows a general flow of data which permits mode switching in a manner consistent with FIGS. 2 and 3. Each block in FIG. 4 represents a general functional component within system 10, some of which correspond to components in FIG. 1.

As described above, mouse/keyboard 22 provides signals from the user. Input router 92, a functional component within host means 20, receives each signal and routes it to another functional component within host means 20. FIG. 4 shows two components which may receive signals from input router 92, emulation interface 94 and host operations 96. While host means 20 is in the emulating mode, input router 92 will route the user signals to emulation interface 94, which provides appropriate signals to emulator 30. But while host means 20 is in the host mode, input router 92 will route the user signals to host operations 96, a functional component which subsumes various operations of host means 20.

As shown, emulation interface 94 and host operations 96 may send signals to each other as a part of responding to a signal from input router 92, and emulator 30 may also send signals back to emulation interface 94. Also, emulator 30 and host operations 96 may each provide signals to display control 98 indicating a change in the corresponding display. Display control 98, another functional component of host means 20, responds by updating the image presented by display 24. Then, when the response to the signals from the user is complete, the next signal from the user can be handled.

The flow of data in FIG. 4 can be realized in various architectures. Although mouse/keyboard 22 and display 24 include appropriate hardware, the remaining components could all be realized as software executed by a central processor exchanging signals with mouse/keyboard 22 and display 24. Each functional component shown could correspond to one or more software modules performing the corresponding function. The invention has initially been implemented, however, on the system described in the workstation applications, in which emulator 30 is a dedicated coprocessor capable of executing IBM PC software and its display is presented in a window within the host display.

2. Coprocessor implementation. The coprocessor architecture described in the workstation applications actually includes three processors which play a role in emulation. Host means 20 includes a host CPU executing host system instructions different than the target system instructions. An input/output processor (IOP) handles input/output (I/O) devices and transfers data between I/O devices and the host CPU. The emulating processor (PCE) shares a bus with the IOP. In general, the host CPU and IOP together provide the functional components of host means 20 described above in relation to FIGS. 2 and 3. As described below, the host CPU provides the functions of input router 92 and host operations 96, with the host CPU and IOP together providing emulation interface 94. The manner in which the host CPU and other components provide the functions of display control 98 are substantially the same as described in the workstation applications.

Figure 5:
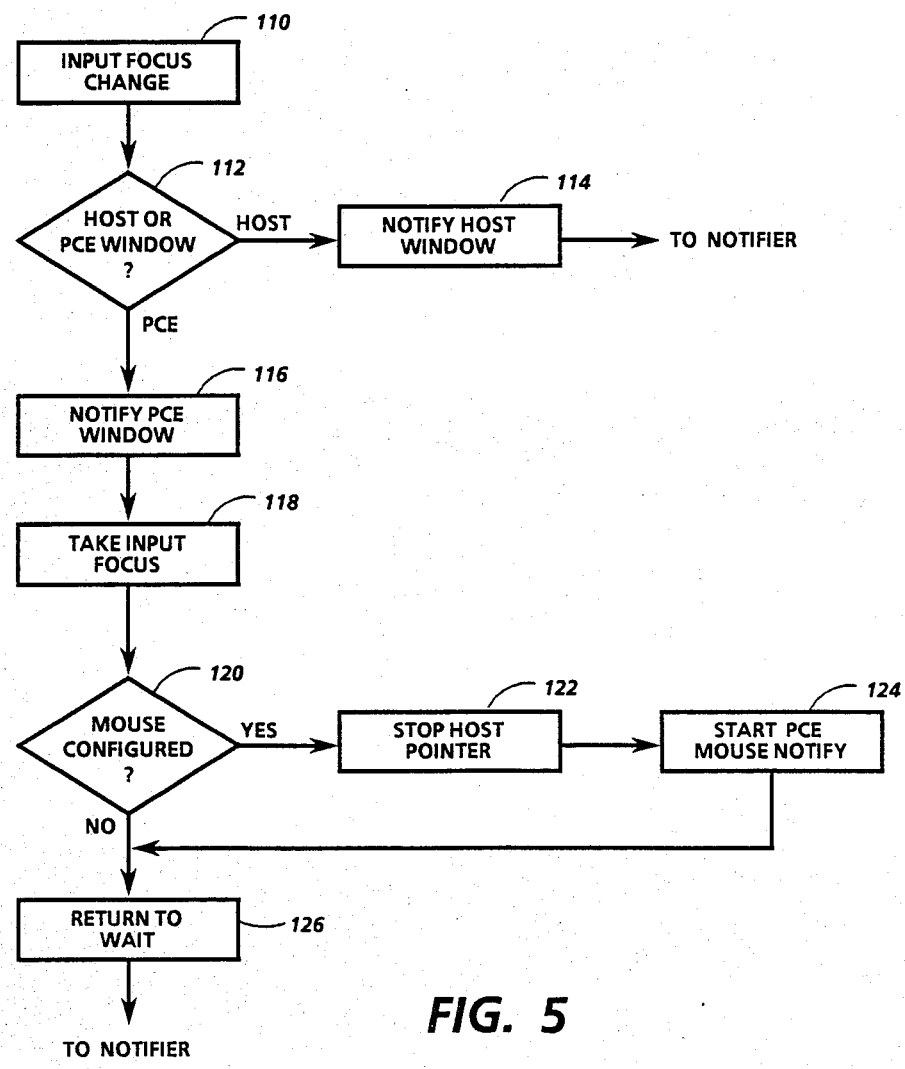
FIG. 5 is a flowchart showing the steps of a procedure executed by the host means of FIG. 1 as part of the function of input routing.

The host CPU described in the workstation applications executes Mesa code including basic workstation (BWS) software which manages the data presented on display 24. When the user provides signals through mouse/keyboard 22, the IOP serves as part of input router 92 by providing the signals to the host CPU, as shown and described in relation to FIG. 28 of U.S. Pat. application Ser. No. 856,525. The technique described there responds fully to each signal from the user before receiving the next user signal, through two software processes called "Stimulus" and "Notifier". Stimulus, as shown and described in relation to FIG. 29 of that application, also serves as part of input router 92 by receiving the user signals and loading them into a buffer from which they can be retrieved by Notifier. Stimulus is consistent with the steps in boxes 72 and 82 of FIG. 3 because it waits for an interrupt from the keyboard processor. Notifier, as shown and described in relation to FIG. 30 of that application, similarly serves as part of input router 92 by calling procedures which update pointer or cursor location and by providing keyboard inputs to the appropriate window. Although Notifier does not actually test whether the user has signaled for a mode switch, as in boxes 74 and 84 in FIG. 3, its operations lead to a mode switch, as will be understood from the discussion below.

a. Host mode to emulating mode. FIG. 5 shows steps which are taken when the user signals a mode switch from the host mode to the emulating mode. If the mode switch were signalled by any arbitrary input directed to the current input focus, similar steps would be performed as a result of accessing the TIP table for the current input focus window, as described in the workstation applications. But one aspect of the invention is that the user may signal a mode switch by providing a signal which changes the input focus to an emulation window at a time when the user has chosen an emulation configuration which includes a mouse. This provides a simple and intuitive mode switch signal which conforms to ordinary expectations. The user typically signals such a change of input focus by clicking the left mouse button when the host pointer is pointing to a position in an emulation window. The user is likely to expect the mouse to operate as an emulated mouse after that.

Notifier keeps track of the current input focus and also of which window currently contains the pointer. Upon receiving a signal indicating a change of input focus, in box 110 in FIG. 5, Notifier notifies the window currently containing the pointer. The flowchart of FIG. 5 branches in box 112 based on whether Notifier notifies one of the host windows in box 114 or notifies an emulation window in box 116. Notifier need not test whether the window being notified is a host window or an emulation window, because a procedure that responds to the notify responds in a manner appropriate to the notified window.

The procedure that responds when an emulation window is notified of a key click, whether indicating a change of input focus or other data, is called MainNotifyProc. MainNotifyProc responds to a notify with a change of input focus by taking the input focus, in box 118. In addition, MainNotifyProc performs a mode switch, as discussed below.

If a host window were notified of a change of input focus in box 114, on the other hand, it would similarly take the input focus and perform any other appropriate host operations, as in box 76 in FIG. 3. Host operations 96 in FIG. 4 are thus provided by the host CPU, and may include any operations relating to that part of the display not occupied by the emulation window, as well as operations for transferring data between the emulation window and other windows as described in the workstation applications.

MainNotifyProc continues its response to the change of input focus by testing in box 120 whether the current emulation configuration includes an emulated mouse. If so, a mode switch is performed. The branch in box 112 and the test in box 120 are thus equivalent to the test in box 74 in FIG. 3 because together they determine whether to switch from host mode to emulating mode.

The host CPU executes a mouse configuration procedure during PCE configuration in which it loads values into data structures in the I/O region indicating whether the user has selected a configuration including a mouse and, if so, which interrupt the user selected as the mouse interrupt. Therefore, by retrieving this data from the I/O region, the test in box 120 can determine whether the emulation configuration includes a mouse. The I/O region, as described in the workstation applications, is a region of memory also used for transfer of data between the host CPU and the IOP. The selection of the mouse interrupt emulates a feature of the Microsoft bus mouse I/O system, a popular mouse system for the IBM PC; this feature allows the user to select the mouse interrupt from those interrupts not assigned to other devices.

The mode switch includes stopping the procedure which causes the host pointer to be displayed, in box 122, so that the host pointer disappears. As part of this step, the position of the host pointer when it disappears is stored so that it can later reapear at the same position. This step is equivalent to the step in box 78 in FIG. 3, because stopping display of the host pointer effectively exits the host mode. The host pointer could alternatively be frozen in its current position, but this could result in confusion with the emulated pointer.

After exit from the host mode, the step in box 124 starts an emulating mode procedure on the host CPU, PCEMouseNotify, which periodically checks whether a signal indicating mouse motion has been received. PCEMouseNotify is one of several NotifyProcs for the emulation window, including MainNotifyProc. In addition to responding to an input focus change, MainNotifyProc is notified whenever a key click is received for the emulation window as a result of it being the input focus. Another NotifyProc handles key clicks when the emulation window is paused to permit transfer of data. These other NotifyProcs are independent of whether the system is in its mouse emulating mode, but starting PCEMouseNotify in box 124 is equivalent to entering the emulating mode in box 80 in FIG. 3. Then MainNotifyProc returns to wait for further notifies, in box 126.

Figure 6:
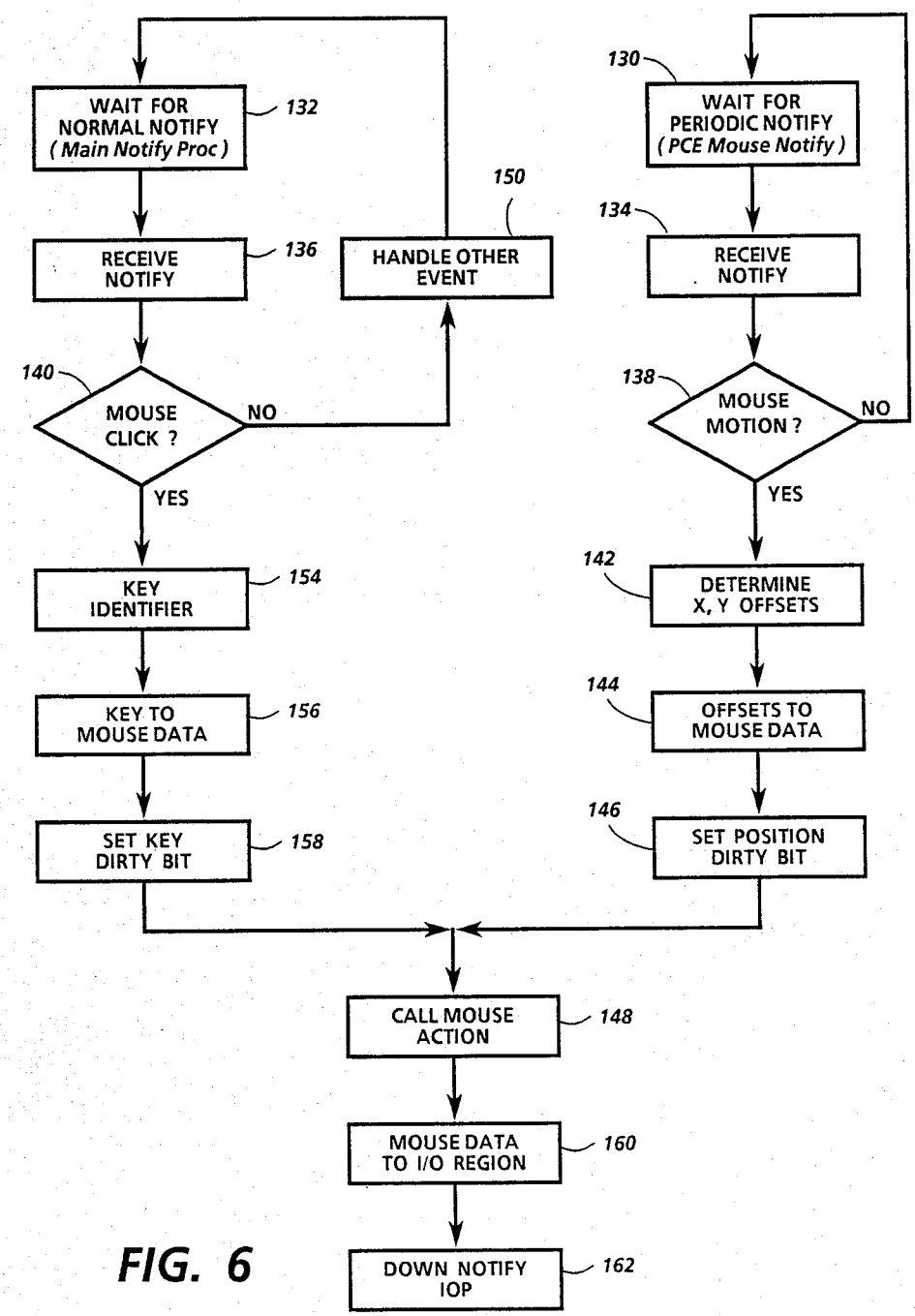
FIG. 6 is a flowchart showing steps executed by the host means of FIG. 1 as part of the function of interface emulation.

FIG. 6 illustrates the emulating mode operation of PCEMouseNotify and MainNotifyProc and a third procedure that each of them calls, MouseAction. PCEMouseNotify and MainNotifyProc begin similarly, each waiting for a notify. In box 130, PCEMouseNotify waits for a periodic notify, which could be provided every 40 milliseconds, for example. This notify will be received from underlying Mesa software that manages PCEMouseNotify and other Mesa procedures. Similarly, in box 132, MainNotifyProc waits for a normal notify from the underlying software, which will result, for example, from a key click on the mouse or on the keyboard. This is the step to which MainNotifyProc returns from box 126 in FIG. 5.

Upon receiving a notify, in box 134 or box 136, each procedure performs a respective test to determine whether the notify results from a mouse-related event. If PCEMouseNotify receives a notify, it tests in box 138 to determine whether mouse motion has occurred. Mouse motion can be detected from cursor position values stored by procedures called by the Notifier, as noted above. Data about mouse motion could also be obtained in a number of other ways, but the preexisting procedures called by the Notifier can be conveniently used to maintain a fictional host pointer position from which x, y offsets can be obtained. As the user moves the mouse, the Notifier receives mouse motion events, and calls a procedure that uses those events to determine x, y offsets as if the host pointer were still displayed. Since the host pointer is not displayed, however, these offsets can be used to determine a fictional pointer position in the form of x, y coordinates. The procedure provides the new x, y coordinates to the Notifier which compares them with the positions of the windows being displayed. If the Notifier finds that the pointer position, whether fictional or actual, is crossing out of a displayed window, it treats that as a keyboard event and calls a NotifyProc of that window with a signal indicating a pointer exit from that window.

MainNotifyProc of an emulation window responds to a pointer exit signal by testing whether the system is in the host mode or in the emulating mode. If in the host mode, MainNotifyProc permits the actual host pointer to leave the emulation window. If in the emulating mode, however, MainNotifyProc responds by jumping the fictional pointer position back into the central area of the emulation window to an area which is not covered by any overlapping window. MainNotifyProc also deletes any subsequent mouse motion or keyboard events in the input buffer loaded by the Stimulus level. MainNotifyProc does not, however, provide signals to the PCE corresponding to the jumping of the fictional pointer or to the deleted events, so that the emulated pointer provided by the PCE is not affected by these operations.

The user is thus able to continue to provide mouse motion signals in any direction at any time during the emulating mode because the fictional pointer position always remains within the emulation window, even though the fictional pointer position does not follow the emulated pointer. Confining the fictional pointer position to the emulation window also ensures that the user cannot provide a mouse click or other signal outside the emulation window, which would result in an undesirable change in input focus during mouse emulation. As discussed below, when the mode switches back to host mode, the fictional pointer position is replaced by the host pointer position, because the host pointer reappears.

If MainNotifyProc receives a notify, it tests in box 140 to determine whether a mouse key click has occurred. Key clicks can be detected by comparing current values with previous values for the mouse keys, because a key click in the emulation window will result in a NotifyProc which changes one of those values.

If PCEMouseNotify or MainNotifyProc determines in box 138 or box 140 that a mouse event has occured, each procedure takes appropriate steps to handle the mouse event, thereby initiating the function of emulation interface 94 in FIG. 4. Each procedure operates to transfer data defining a mouse event to the I/O region so that the IOP can in turn transfer that data to the PCE.

If mouse motion has occurred, PCEMouseNotify determines x, y offsets of the emulated pointer from its previous position based on scaling the fictional pointer position offsets, in box 142. The offsets are stored in a data structure called MouseData in the I/O region in box 144 and a dirty bit indicating the pointer position has changed is set in box 146. PCEMouseNotify then calls another procedure, MouseAction, in box 148. If no mouse motion has occurred, PCEMouseNotify returns to box 130 to wait for the next periodic notify. If mouse motion has occurred, PCEMouseNotify returns to box 130 to wait only after calling MouseAction in box 148.

If MainNotifyProc determines in box 140 that the event which resulted in a notify to it was not a mouse click in the emulating mode, it handles that other event appropriately, in box 150. For example, if the event is a change of input focus to the emulation window, MainNotifyProc performs the steps in boxes 118, 120, 122 and 124 in FIG. 5. Or if the event is a pointer exit from the emulation window, MainNotifyProc responds as described above, permitting the host pointer to exit but moving the fictional pointer position to ensure that the emulated pointer stays within the emulation window.

If MainNotifyProc determines, on the other hand, that the event was a mouse key click in the emulating mode, MainNotifyProc obtains an identifier of the clicked key in box 154 and loads that identifier into MouseData in box 156. Then, in box 158, MainNotifyProc sets a dirty bit for a key click, and similarly calls MouseAction in box 148. After making this call, MainNotifyProc returns to wait in box 132.

MouseAction transfers the contents of MouseData to the I/O region in box 160. This may be done in the following order: dirty bits; x offset; y offset; and mouse key. When the data structure in the I/O region has been completed, MouseAction provides a downnotify to the IOP in box 162, in the manner described in the workstation applications. Meanwhile, PCEMouseNotify or MainNotifyProc has returned to wait in box 130 or box 132. At this point, the IOP responds to the downnotify, performing further functions of emulation interface 94 in FIG. 4, as described in greater detail below in relation to BIOS mouse data 44a.

b. Emulating mode to host mode. The mode switch from emulating mode to host mode is also performed by the host CPU. During emulating mode, the fictional pointer cannot be moved outside the emulation window, so that the user signal to indicate this mode switch cannot be done by changing the input focus to a different window with a mouse click. Furthermore, during emulation the host CPU and the IOP provide most of the user signals from mouse/keyboard 22 to emulator 30. As a result, the user signal for this mode switch must not be one of the signals that would otherwise be provided to emulator 30. A number of other signals on the system described in the workstation applications could be used, but the following discussion is based on using the STOP key on the keyboard as the signal for this mode switch.

Figure 7:
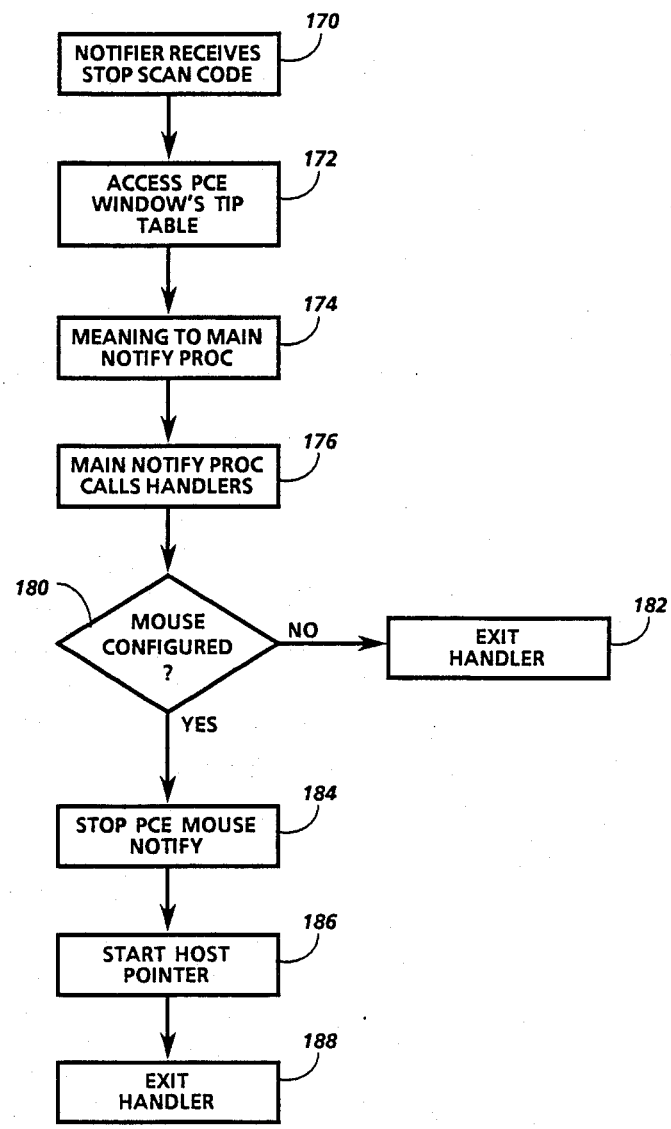
FIG. 7 is a flowchart showing steps executed by the host means of FIG. 1 as part of the function of input routing.

FIG. 7 shows steps within the Notifier and MainNotifyProc of the emulation window which result in a mode switch from emulating mode to host mode, and which therefore provide functions of input router 94 in FIG. 4. The Notifier receives a stop scan code, a signal indicating user operation of the STOP key in box 170. Since the STOP key does not indicate a change of input focus, the Notifier concludes that the appropriate TIP table to be accessed is that of the current input focus, which will be the emulation window during the emulating mode. The emulation window's TIP table is accessed in box 172, retreiving a meaning for each signal from the user. That meaning is provided to the emulation window's MainNotifyProc in box 174. The TIP table is thus equivalent to part of the mode switch test in box 84 of FIG. 3 because the meaning of any of the keys other than the STOP key will not lead to a mode switch, and appropriate data corresponding to each such key will be provided to emulator 30, as in box 86 in FIG. 3. MainNotifyProc of the emulation window will provide that data in the process of handling a notify in box 150 in FIG. 6.

If MainNotifyProc receives a notify with a signal meaning a mode switch to host mode, it handles that event in box 150 by calling appropriate handler routines in box 176. One of the handlers tests in box 180 to determine whether the mouse is configured during the current emulation session. This test is also equivalent to part of the mode switch test in box 84 of FIG. 3, because it helps to determine whether the user signalled a mode switch from emulating mode to host mode. If not, the handler exits in box 182, since the mode switch cannot occur except when the mouse is configured during emulation. But if the mouse is configured, the handler stops the periodic notification of PCEMouseNotify, discussed above, in box 184, which has the effect of exiting from the emulating mode, as in box 88 in FIG. 3. Then, the handler restarts display of the host pointer, in box 186, which has the effect of entering the host mode, as in box 70 in FIG. 3. At this point the handler exits, in box 188, and the host mode continues in the manner described above until another mode switch back to the emulating mode. The host pointer may be made to reappear at the same position as when the host mode was last left, because that value was stored, as noted above.

As noted above, during the emulating mode the IOP provides data from the I/O region to the PCE through BIOS mouse data 44a in BIOS area 34, performing part of the function of emulation interface 94. We turn now to examine this data structure in more detail.

C. Mouse Data Structure

The use of a data structure in BIOS area 34, the memory space allocated to BIOS, to transfer data to the PCE is feasible with the system described in the workstation applications because that system can use a BIOS which is not stored in ROM. Therefore, data can be written into this region of memory and retrieved from it by the PCE.

The data within BIOS mouse data 44a may be organized in many ways, provided that both the IOP and the PCE have the necessary information to access the data structure properly. For example, in addition to the data loaded into the I/O region by the host CPU and transferred by the IOP, as described above, BIOS mouse data 44a may include data provided by the PCE itself when executing BIOS and used by mouse driver 46 in determining whether the machine on which it is running is capable of mouse emulation.

In loading BIOS mouse data 44a, the IOP performs a task which resembles the emulation handler tasks described in one of the workstation applications, U.S. patent application Ser. No. 856,526. As shown and described in relation to FIGS. 33-34 of that application, a specialized operating system can run on the IOP which supports a multitasking queue within which tasks are managed. The tasks are initialized with appropriate procedures prior to being available for the queue. The tasks may be in a number of states when not in the queue, including a jammed state, a wait for time state, a wait for condition state and a wait for interrupt state. As shown and described in relation to FIGS. 35 and 36, the IOP responds to a downnotify from the host CPU calling for configuration, boot or exit with appropriate procedures.

By analogy to the other IOP procedures used in emulation, the procedures relating to the loading of BIOS mouse data 44a are referred to collectively as the mouse handler task. The mouse handler task includes an initialization procedure to set up certain variables used by other mouse handler procedures. For example, if other procedures are stored in main memory rather than the IOP's local RAM, the addresses of those procedures may be stored in the I/O region for subsequent use. The initialization procedure jams the mouse handler task. Although data about the mouse is loaded into the I/O region during configuration, as described above, the IOP does not change the state of the mouse handler task at configuration time. During boot, a mouse handler boot procedure restarts the mouse handler task, so that it enters the wait for system state and is ready to be placed on the multitasking queue to be run. Finally, during exit from emulation, a mouse handler exit procedure again jams the mouse handler task, ending its activity.

While it is active, the mouse handler's main task is run whenever it comes up on the queue. This main task includes two parts. The first part moves the value indicating whether mouse emulation is configured from the I/O region to BIOS mouse data 44a, and also moves the value indicating the selected mouse interrupt to BIOS mouse data 44a. It also uses the selected mouse interrupt value to determine on which port it should provide a mouse interrupt to the PCE, and stores this port in the I/O region for future use. The first part of the main task then ends by entering the wait for condition state, waiting for a downnotify from the host CPU.

The second part of the main task responds to a downnotify by loading the x and y offsets, the mouse key data and the dirty bits from the I/O region into BIOS mouse data 44a. In loading these and the other data into BIOS mouse data 44a, the main task loads them in predetermined positions so that mouse driver 46 can find them. This can be done, for example, by having a predetermined base address for BIOS mouse data 44a from which each item of data is offset by a predetermined amount. When the data has been loaded, the second part of the main task sends an interrupt to the PCE on the port stored in the I/O region by providing arbitrary data on that port. The PCE will service this interrupt when the IOP subsequently permits it to run. Meanwhile the second part of the main task is completed by returning to the wait for condition state, awaiting another downnotify from the host CPU.

In addition to the values loaded by the IOP, BIOS mouse data 44a can include other data used by the PCE during mouse emulation, such as data defining system 10. Such data can subsequently be used by mouse driver 46, for example, in determining whether that system is capable of mouse emulation.

In general, mouse driver 46 serves two basic functions: It handles interrupts from host means 20 or other sources and it handles service requests from mouse application 42 or other higher level applications which provide mouse-related service requests. These functions are related because mouse driver 46 uses the data it receives by handling interrupts from host means 20 in handling the service requests from higher level applications. Given a definition of the standard responses to the standard service requests, and given the data available from host means 20, it is straightforward to provide a mouse driver which will receive appropriate data from host means 20 and subsequently use that data to provide the standard responses to standard service requests.

The data included in BIOS mouse data 44a depends on the system on which the invention is implemented. If implemented on the system described in the workstation applications, BIOS mouse data 44a can include all the mouse-related data transferred through the I/O region by the host CPU to the IOP. As described above, that data includes data indicating whether the mouse is configured; data indicating which interrupt is the mouse interrupt; data indicating x and y displacements; data indicating which mouse key has been clicked; and dirty bit data indicating whether mouse position or key data has been updated. This data is sufficient for mouse driver 46 to provide the standard responses to the standard service requests for the Microsoft mouse driver.

The interrupt handler in mouse driver 46 responds to an interrupt from host means 20 by using the mouse data address to access BIOS mouse data 44a and then tests the dirty bit data. If no change has been made, there is no need to retrieve further data from BIOS mouse data 44a, so the interrupt handler exits. If the dirty bit data indicates a change in the displacements, the interrupt handler can set a flag or other value indicating new data and retrieve the x and y displacement data from BIOS mouse data 44a. If the dirty bit data indicates a change in a mouse key, the handler can similarly set a flag or value indicating new data and retrieve data identifying the clicked key from BIOS mouse data 44a. Then, if new data has been received, the interrupt handler can do any appropriate further processing to place the new data in a form which can be efficiently used to handle service requests. This could be done, for example, by updating variables used by the service request handler. Finally, the interrupt handler exits, returning the PCE to the operations in progress when the interrupt was received or to the next interrupt.

The Microsoft mouse driver responds to service requests from higher level applications which take the form of BIOS interrupts 10$h$ and 33$h$. Interrupt 10$h$ is a video service request and interrupt 33$h$ is a mouse service request. In addition, higher level applications may call the Microsoft mouse driver using the file name Mouse.com. Therefore, mouse driver 46 should have the file name Mouse.com so that it will run when a high level application calls Mouse.com. In addition, to provide the standard responses to the standard service requests handled by the Microsoft mouse driver, mouse driver 46 should respond appropriately to BIOS interrupts 10$h$ and 33$h$. In addition, as noted above, mouse driver 46 responds to interrupts from host means 20.

In order to operate, mouse driver 46 must be installed. This can be done the first time the user provides the command "mouse" in response to the DOS prompt. The installation procedure can include checking a value from BIOS mouse data 44a or from elsewhere that indicates the type of machine. If the type of machine is not appropriate or if mouse emulation is not configured, as indicated in BIOS mouse data 44a, the installation procedure can exit without installing, providing appropriate messages. Otherwise, the installation procedure can set the sensitivity of the mouse and set up the interrupts described above so that the appropriate procedures in mouse driver 46 are called in response to each interrupt. Setting up the interrupts includes retrieving the mouse interrupt selected by the user from BIOS mouse data 44a and installing the corresponding interrupt vector to call the interrupt handler when that interrupt is received. Setting up the interrupts also includes setting up BIOS interrupts 10$h$ and 33$h$ with respective vectors to call the corresponding service request handlers in mouse driver 46. The installation procedure can also delete itself as it exits to free memory space.

During execution of higher level applications, emulator 30 will provide outputs to update its display. This can occur as described in the workstation applications, so that display control 98 includes those components of host means 20 which detect display updates by emulator 30 and which access its display region in memory to retrieve the updated information.

D. Miscellaneous

The present invention could be implemented in many ways. The mouse mode switching signals could be any appropriate signals, and more than one switching signal could be available for switching between host mode and emulating mode. The procedures followed in switching between modes depend heavily on the system on which the invention is implemented. For example, as noted above, emulator 30 need not be a coprocessor, but could be one of a number of tasks or modes on a processor which also executes software providing host means 20.

Similarly, in connection with the use of BIOS mouse data 44a to transfer data to emulator 30, the particular data transferred could be any set of data suitable for whichever mouse driver is running on the system. Furthermore, a data structure like BIOS mouse data 44a could be used for transferring other data between host means 20 and emulator 30, provided that applications to be run on emulator 30 do not make direct calls to ports in the target system being emulated.

The invention is applicable generally to interactive interfaces, and the term "display" as used herein is intended to include any presentation of data to a user within which a pointer can be used to indicate a position. A display may thus be provided by generating its bitmap or by any other technique which combines data to specify the contents of the display. The term "pointer" is not limited to any specific shape, size or other characteristics, but can be any perceptible indicator of position within a display. Pointer control therefore includes any steps which position a pointer within a display, define its characteristics, or otherwise determine the manner in which it is included in a display.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A system comprising:
    first means for providing a first image for display, the first means being operable to perform pointer control within the first image;
    second means for providing a second image for display, the second means being operable to perform pointer control within the second image; the second means being responsive to the first means to include the first image as a part of the second image; and
    input means for receiving signals from a user, the signals from the user including a switch request signal, the input means providing the switch request signal to the second means;
    the second means further being for switching in response to the switch request signal between a first mode in which the first means performs pointer control and a second mode in which the second means performs pointer control.

2. The system of claim 1 in which the first means comprises an emulator executing a sequence of instructions including target system instructions executable by a central processor of a target system being emulated.

3. The system of claim 2 in which the input means comprises a mouse for providing the switch request signal, the sequence of target system instructions including a mouse application executable by the target system central processor.

4. The system of claim 2 in which the emulator provides output signals and receives input signals during execution of the target system instructions; the second means comprising a host system for receiving output signals from the emulator and for providing input signals so that the emulator continues to execute the sequence of target system instructions.

5. The system of claim 4 in which the emulator has a reserved memory space which is not written by applications; the host system comprising means for loading data into a data structure in the reserved memory space to transfer the data to the emulator.

6. The system of claim 4 in which the host system provides some of the input signals to the emulator based on corresponding signals from the user when the second means is in the first mode; the switch request signal indicating a switch of pointer control from the first means to the second means, the second means switching from the first mode to the second mode when the switch request signal is received and the second means is in the first mode; the host system not providing an input signal to the emulator based on the switch request signal.

7. The system of claim 1 in which the second means includes the first image within a window in the second image; the first means performing pointer control when the second means is in the first mode by including a pointer indicating a position within the first image in the window.

8. The system of claim 7 in which the signals from the user include pointer movement signals indicating pointer movement, the input means providing the pointer movement signals to the second means, the second means further being operable, when in the first mode, to provide scaled pointer movement signals to the first means based on the pointer movement signals.

9. The system of claim 8 in which the input means comprises a mouse, the pointer movement signals being received when the user moves the mouse.

10. The system of claim 8 in which the second means is further operable, while providing scaled pointer movement signals to the first means, to maintain coordinates indicating a fictional pointer position within the first image in the window based on the pointer movement signals and, upon receiving pointer movement signals which would move the fictional pointer position indicated by the coordinates out of the first image in the window, changing the coordinates so as to keep the fictional pointer position within the first image in the window.

11. The system of claim 10 in which the second means performs pointer control by including a pointer indicating a position within the second image, the signals from the user further including an input focus signal indicating a change of input focus to the position indicated within the second image; the input means providing the input focus signal to the second means; the second means switching from the second mode to the first mode when the input focus signal is received and the position indicated within the second image is within the window.

12. The system of claim 1 in which the signals from the user further include a user selection indicating whether the first means performs pointer control, the input means providing the user selection to the second means; the second means further switching between the first and second modes based on the user selection.

13. The system of claim 1 in which the second means is further operable to perform pointer control within the part of the second image that is the first image.

14. A method of using the system of claim 13, comprising:
    when the second means is in the first mode, operating the second means to switch from the first mode to the second mode; and
    operating the second means to begin performing pointer control by presenting a pointer within the part of the second image that is the first image.

15. A method of using the system of claim 13, comprising:
when the second means is in the second mode and is performing pointer control within the part of the second image that is the first image, operating the second means to switch from the second mode to the first mode;
operating the second means to provide signals to the first means; and
operating the first means to perform pointer control within the first image in accordance with the signals provided by the second means.

16. A system comprising:
emulating means for executing a sequence of instructions including target system instructions executable by a central processor of a target system, the target system instructions including an application which provides service requests; the sequence of instructions further including request handling instructions for responding to the service requests; the emulating means having a reserved memory space which is not written by the application; the emulating means further providing output signals and receiving input signals while executing the sequence of instructions; and
host means for receiving the output signals and providing the input signals for the emulating means so that the emulating means continues to execute the sequence of instructions; the host means further being for loading data into a data structure in the reserved memory space to transfer the data to the emulating means.

17. The system of claim 16 in which the emulating means is further for providing an emulation image for display, the emulation image emulating an image provided on a display of the target system, the emulating means being operable for performing pointer operations within the emulation image; the host means further being for providing a host image for display; the host means being responsive to the emulating means to include the emulation image within the host image; the system further comprising input means for receiving input signals from a user, the input signals from the user including pointer related signals relating to pointer operations within the emulation image; the input means providing the pointer related signals to the host means and the host means loading the data based on the pointer related signals.

18. The system of claim 17 in which the input means comprises a mouse with at least one key, the pointer related signals including pointer movement signals resulting from movement of the mouse and pointer control signals resulting from clicking one key of the mouse.

19. The system of claim 17 in which the host means further comprises a host processor operable for performing pointer operations within the host image and for receiving the input signals from the user and providing data to be loaded into the data structure based on the input signals from the user, the host means further comprising an intermediate processor for receiving the data to be loaded from the host processor and for loading that data into the data structure.

20. The system of claim 16 in which the emulating means and host means each have a respective stored address for accessing the data structure, the respective stored addresses having the same value.

21. The system of claim 16 in which the host means is further for providing an input signal to the emulating means when the data structure is loaded.

22. The system of claim 21 in which the input signal provided by the host means is an interrupt signal, the sequence of instructions further including interrupt handling instructions, the emulating means further being operable for responding to the interrupt signal by executing the interrupt handling instructions, the emulating means retrieving data from the data structure while executing the interrupt handling instructions.

* * * * *